United States Patent Office 3,424,579
Patented Jan. 28, 1969

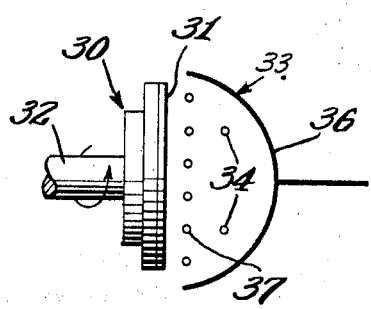
CHARGE
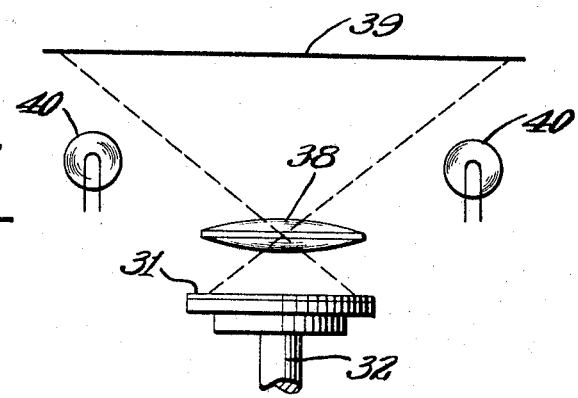
EXPOSE
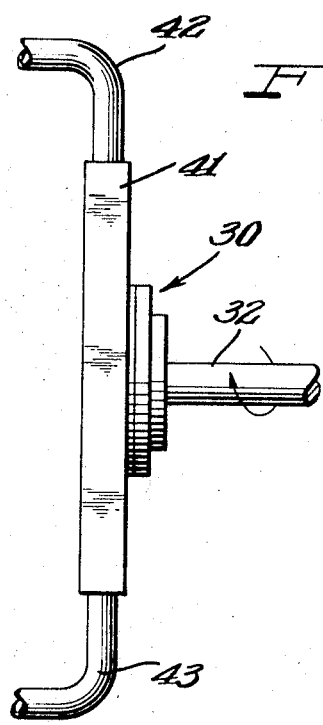
DEVELOP
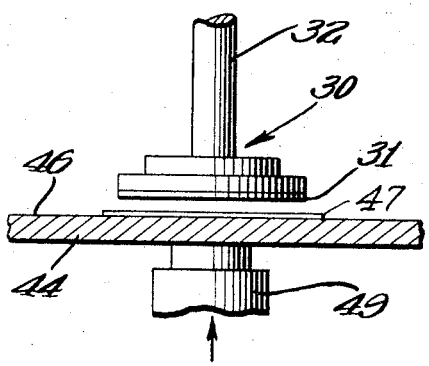
TRANSFER

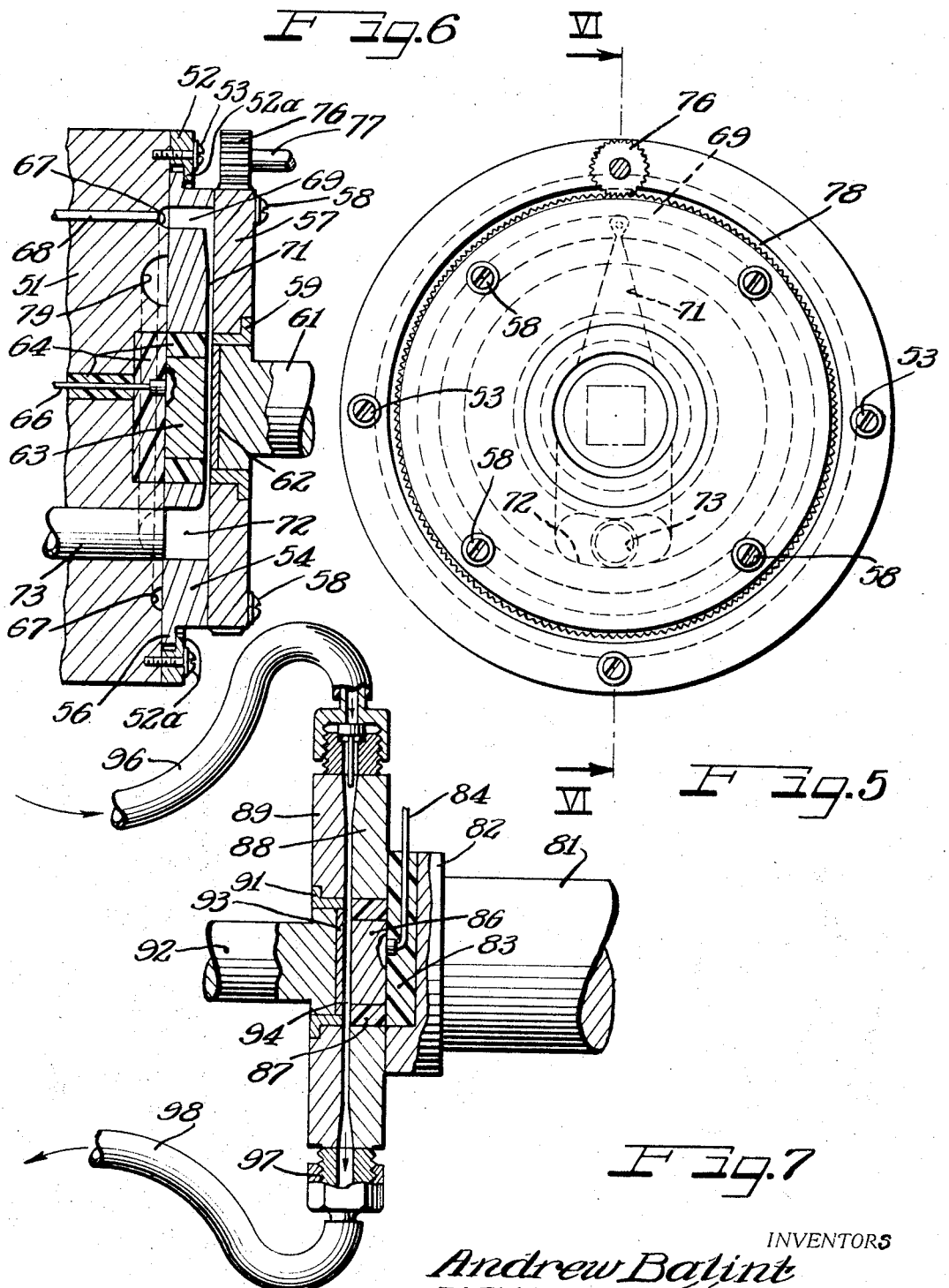

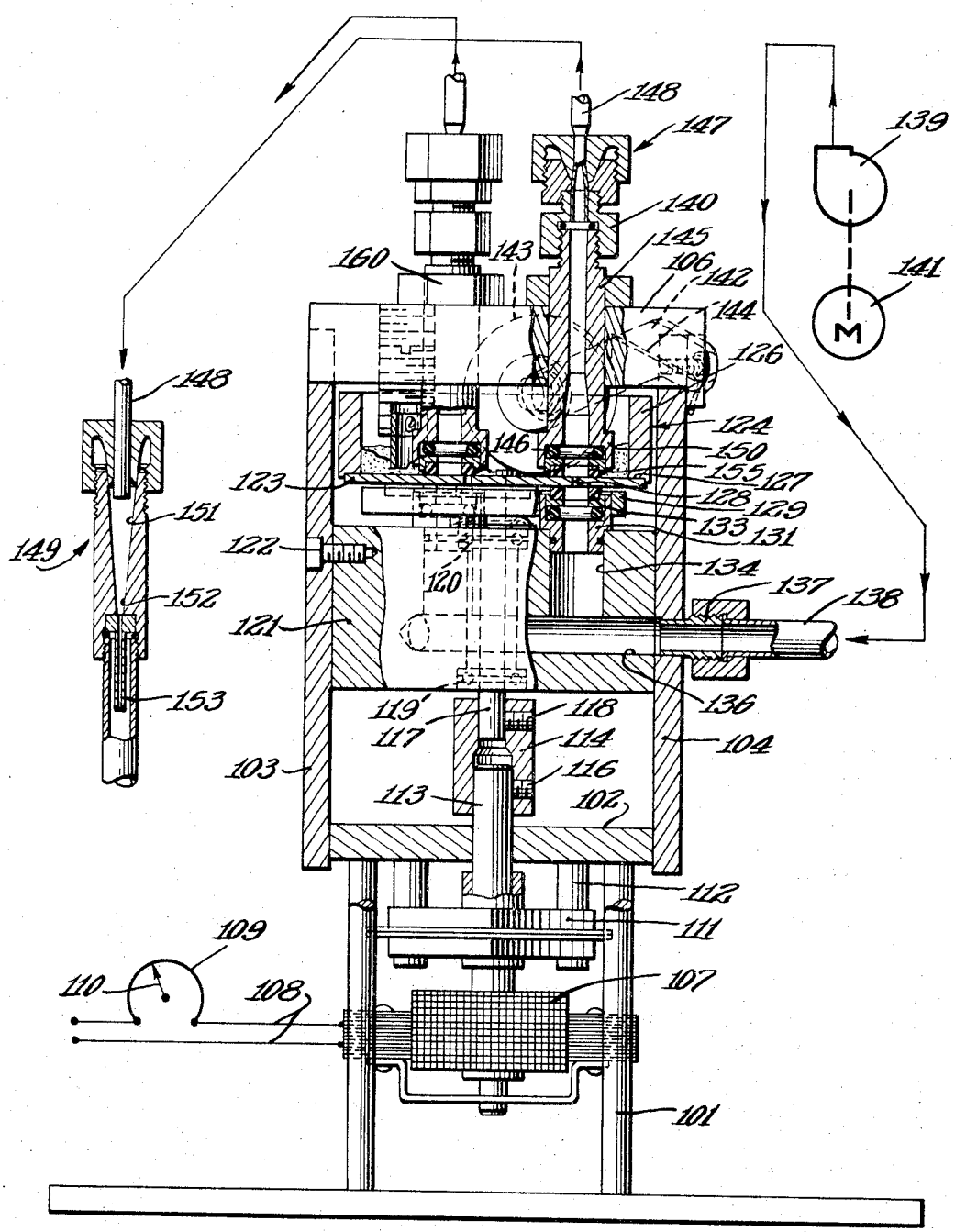

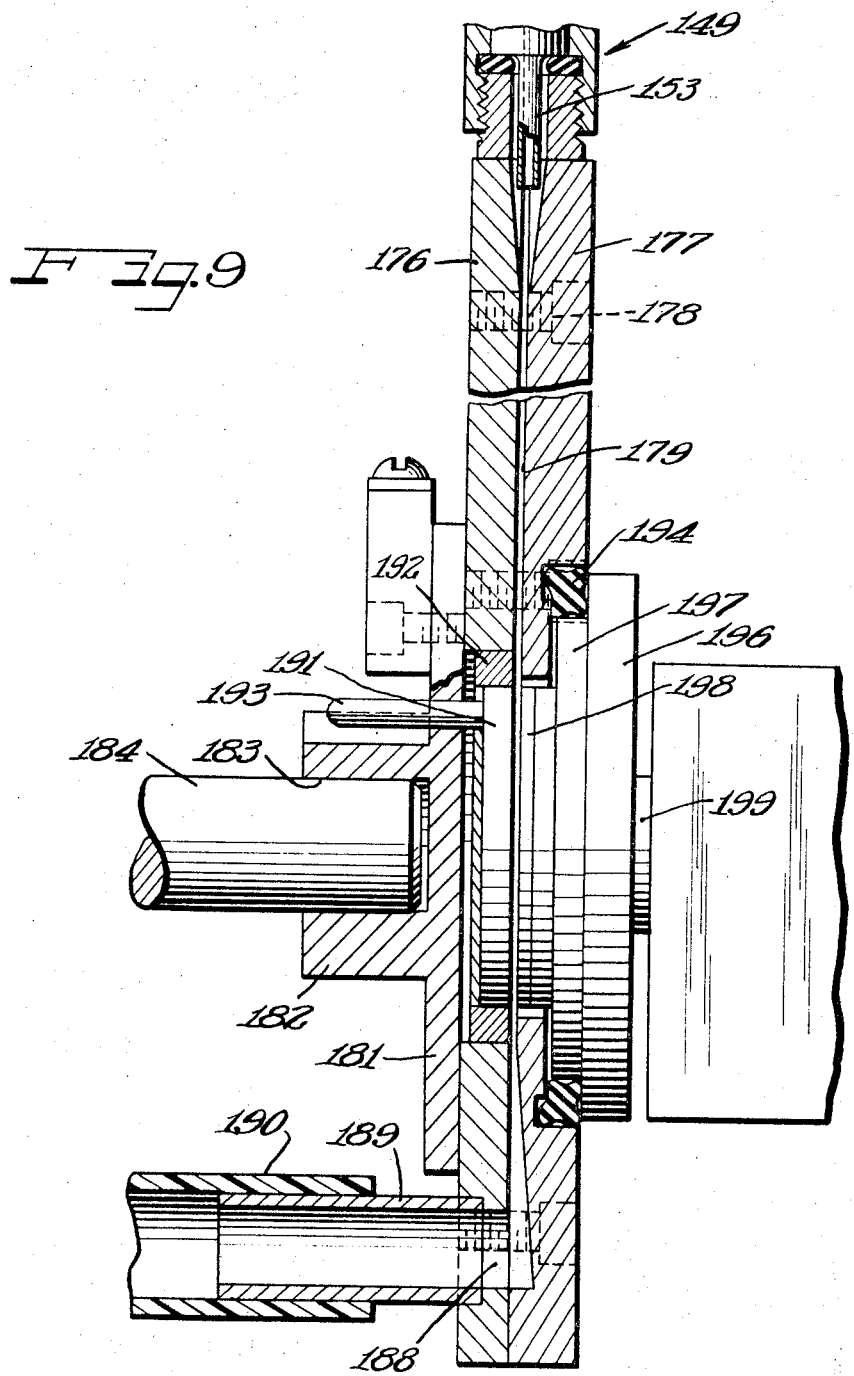

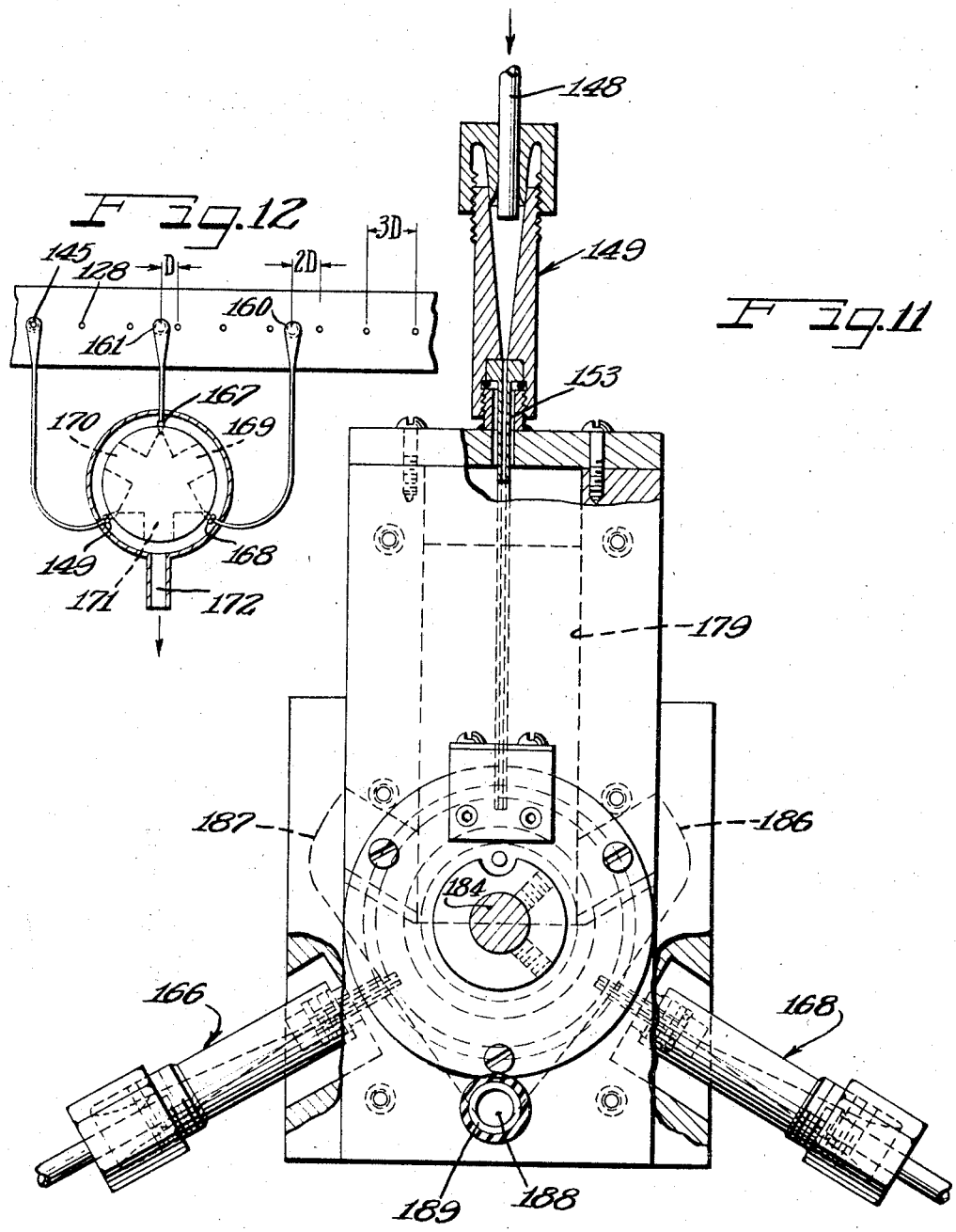

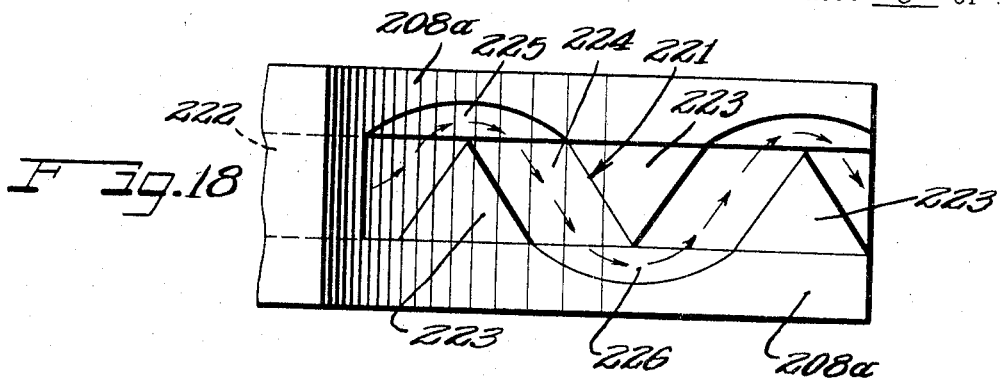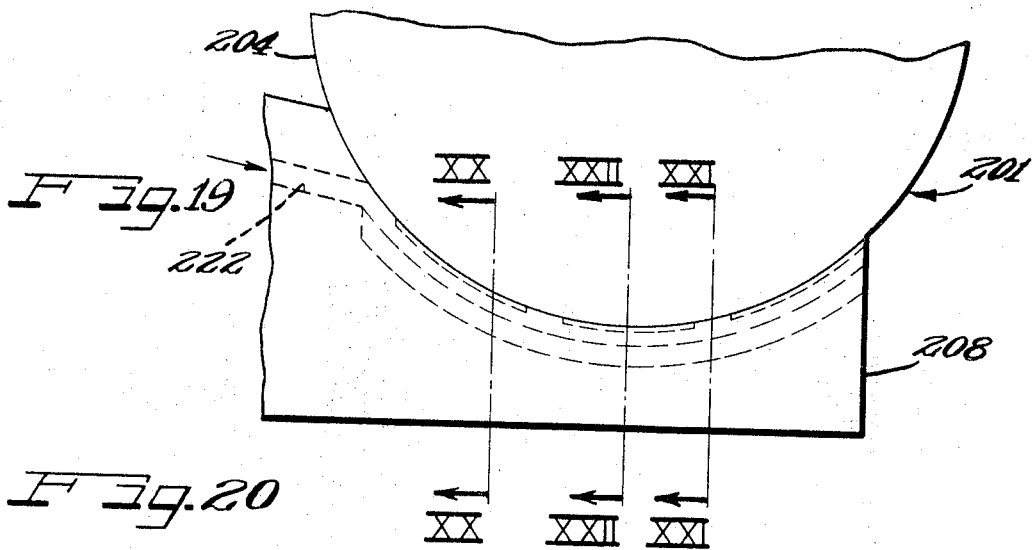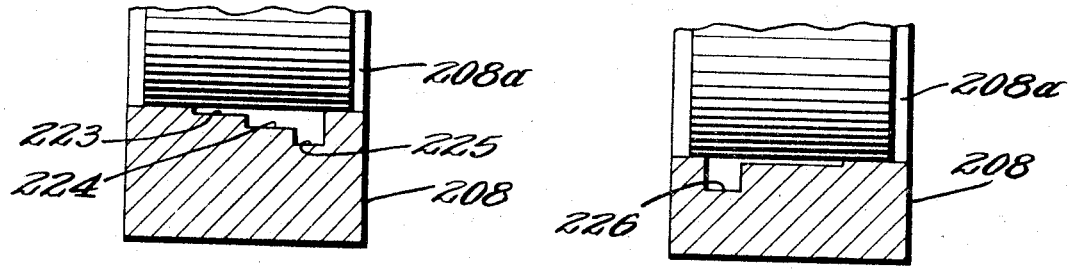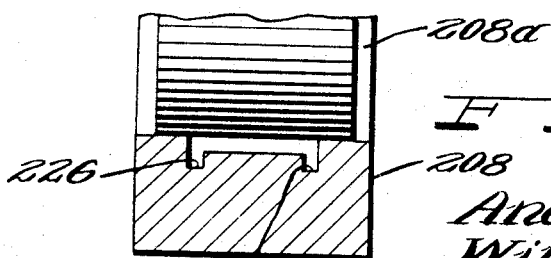

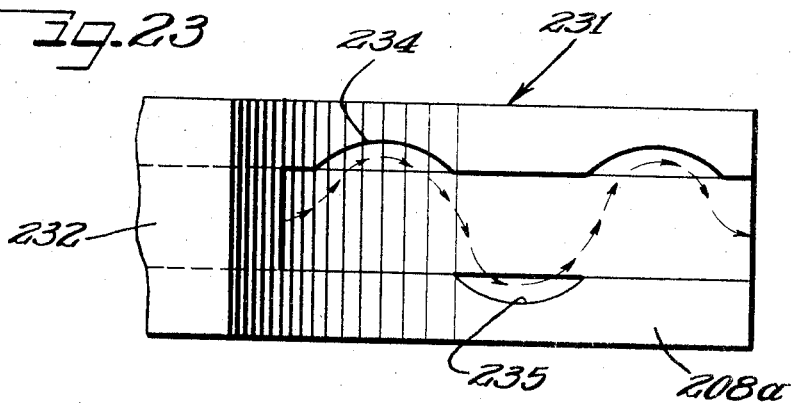
Fig. 23
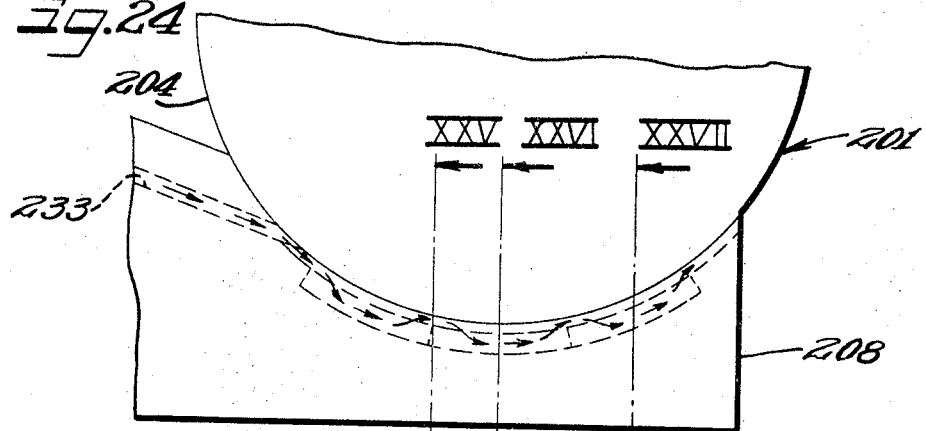
Fig. 24
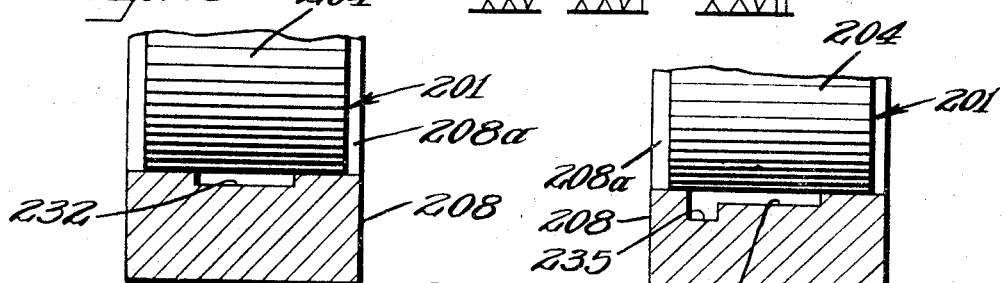
Fig. 25 Fig. 26 Fig. 27
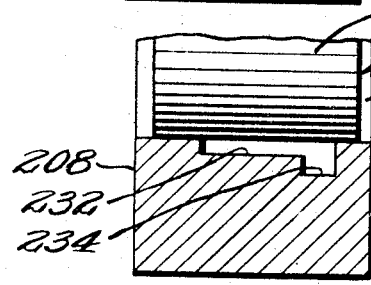
INVENTORS
Andrew Balint
William E. Bixby
Len A. Tyler
ATTORNEYS … Patent text …

---

3,424,579
METHOD AND APPARATUS FOR ELIMINATING TEARS AND STREAKS IN ELECTROSTATOGRAPHY
Andrew Balint, Park Ridge, William E. Bixby, Deerfield, and Len A. Tyler, Evanston, Ill., assignors to Bell & Howell Company, Chicago, Ill., a corporation of Illinois
Filed Nov. 25, 1964, Ser. No. 413,784
U.S. Cl. 96—1
Int. Cl. G03g 13/22
16 Claims

ABSTRACT OF THE DISCLOSURE

A method and apparatus for eliminating the presence of tears and streaks in development of an electrostatographically reproduced microimage by directing toner particles across a previously charged and exposed photoconductive surface, from a plurality of directions.

DISCLOSURE

The present invention relates to improvements in electrostatography, the invention finding particular utility in the field of micro-imagery for producing reduced sized images of pages of books, periodicals, or other original documentary material on the surface of an opaque or transparent standard size library catalog card or business machine card, or other record media.

There are numerous instances in the field of information storage and retrieval as well as in the field of information dissemination, for example, in school or research libraries, where the demand at any given time for a book, journal, or other document exceeds the number of copies that it is economicaly feasible for the information center to retain. Then, too, the copy available may be the only one in existence. To loan such scarce documents for an appreciable time deprives others of the opportunity of examining and using the same, and a temporary loan frequently may not be long enough for adequate study of the document.

Through the improvements of the present invention, it is possible to provide a system wherein reduced sized images of pages of books, periodicals, or other originals may be produced on the surface of an opaque or transparent standard size library catalog card or on a card of the type generally similar to a business machine card. This permanent reduced sized copy can then be used for immediate or future references. Meanwhile, the original reference material remains in a central file available for use by other persons.

In a typical example, the book or journal to be copied would be brought to a machine and placed face down on an exposure platen. An appropriate card adapted to receive the micro-image would be positioned over a corresponding reference window. The machine would then be set into operation and within a short time, the card would be returned bearing a completed micro-image of the original on a specifically aligned and selected position. The next page of the original would then be properly placed on the exposure platen and the card again positioned to receive the next image. This cycle would be repeated until all of the desired pages were copied. At a 12 to 1 reduction, a single 3 x 3 card could accommodate 18 pages of information normally appearing on a maximum sized document of 8½ x 11″. Should opaque cards be used, both sides of the cards could be utilized, thereby doubling the capacity of the image card.

When business machine type cards are employed, not only can normal sized title information be utilized, but it is also possible to provide a section of the card with coded information thereon, making the record amenable to automated retrieval.

In addition to planetary type machines, it is also possible to provide a continuous process wherein a multiplicity of documents are moved through an exposure station and the micro-images are placed on a continuous film strip.

In providing methods and apparatus for accomplishing the foregoing objectives by electrostatographic techniques, specific problems are introduced because of the necessity of maintaining the high standards associated with micro-imagery work. However, the usual techniques for electrostatographic reproduction do not always provide acceptable micro-reproductions because of the presence of tears and streaks which frequently result when particles of a toner material are flowed unidirectionally past an image plane, particularly at the leading and trailing edges of the image area. The problem of tears and streaks is not confined to micro-imagery although it is particularly acute there, and so the method and apparatus of the present invention are applicable to electrostatographic reproduction generally.

An object of the present invention is to provide an improved method for eliminating tears and streaks in edectrostatographic reproduction.

Another object of the present invention is to provide an improved method of electrostatographic reproduction particularly adaptable for micro-imagery.

Another object of the invention is to provide an improved apparatus for developing electrostatographic images which results in improved developed images.

In accordance with the present invention, we provide a method of electrostatographic reproduction which includes the steps of electrostatically charging a photoconductive surface, applying a light image to the charged surface to produce a latent electrostatic image thereon, positioning a source of particulate toner material at the periphery of the image, establishing relative movement between the surface and the source, and distributing particulate toner in a plurality of directions across the surface during such relative movement to thereby avoid tearing and streaking of the image. The distribution of the toner material in a plurality of directions should be construed broadly, as evident from the following description of specific embodiments of the invention. The apparatus for producing this result can take many diverse forms, depending upon the specific type of electrostatographic medium. In the case of a flat photoconductive surface, the results can be achieved by rotating the exposed photoconductive surface on an axis of rotation intersecting the surface, i.e., normal to that surface, and distributing toner particles along the surface in a direction which is generally perpendicular to the axis of rotation. Alternatively, the exposed photoconductive surface can be held stationary and the source of toner material can be rotated about the periphery of the surface thereby distributing toner particles continuously in constantly varying radial directions across the surface of the photoconductor. As another alternative, both the photoconductive surface and the toner supply can be stationary, by providing a series of spray devices about the periphery of the photoconductive surface, and feeding the spray devices with toner particles in sequence so that the direction of traverse or sweeping of the toner particles across the exposed photoconductive surface is continuously changing.

In continuous processes utilizing strip film and a rotatable drum type photoconductive element still another type of apparatus is provided by the present invention. The apparatus in this case includes a developing electrode which has a portion of its periphery in conformity with the rotating surface of the cylinder, the electrode being provided with flow control means such as a groove which is at least partially undulating, so that an airborne mixture of toner particles is directed into the groove and undergoes a continuous variation in direction of movement as it passes through the undulating groove while in spaced parallel relationship to the periphery of the cylinder.

Various other features of the present invention will become apparent to those skilled in the art from the following description of the attached sheets of drawings which illustrate several embodiments of the invention.

ON THE DRAWINGS

FIGURES 1 to 4 inclusive are somewhat schematic views illustrating the sequence of steps of charging, exposing, developing, and transferring involved in practicing the method of the present invention with a planetary system and process;

FIGURE 5 is a view in elevation of a modified form of the invention in which the toner powder source is rotated relative to the plate being developed;

FIGURE 6 is a cross-sectional view taken substantially along the line VI—VI of FIGURE 5;

FIGURE 7 is a view partly in elevation and partly in cross-section of another form of the invention in which the toner source and the exposed plate are oscillated relative to each other during development;

FIGURE 8 is a cross-sectional view of a generator device for producing suspensions of the toner particles in an airstream, with portions thereof being shown schematically;

FIGURE 9 is a cross-sectional view of a developing device which can be supplied from the generator assembly of FIGURE 8;

FIGURE 11 is a view partly in elevation and partly in cross-section of a form of the invention employing toner nozzles or spraying means which are sequentially energized;

FIGURE 12 is a schematic view including a development illustrating the principles of operation of the device of FIGURE 11;

FIGURE 18 is a plan view of another form of development electrode which can be employed in conjunction with the system shown in FIGURE 13;

FIGURE 19 is a fragmentary view in elevation of the electrode shown in FIGURE 18 in combination with the photoconductive cylinder;

FIGURE 20 is a fragmentary cross-sectional view taken substantially along the line XX—XX;

FIGURE 21 is a fragmentary cross-sectional view taken substantially along the line XXI–XXI of FIGURE 19;

FIGURE 22 is a fragmentary cross-sectional view taken substantially along the line XXII–XXII of FIGURE 19;

FIGURE 23 is a plan view of still another modified form of configuration of development electrode useful in accordance with the present invention;

FIGURE 24 is a fragmentary view in elevation showing the manner in which the development electrode of FIGURE 23 cooperates with the photoconductive cylinder;

FIGURE 25 is a cross-sectional view taken substantially along the line XXV–XXV of FIGURE 24;

FIGURE 26 is a fragmentary cross-sectional view taken substantially along the line XXVI–XXVI of FIGURE 24; and FIGURE 27 is a fragmentary cross-sectional view taken substantially along the line XXVII–XXVII of FIGURE 24.

AS SHOWN IN THE DRAWINGS

Figure 10:
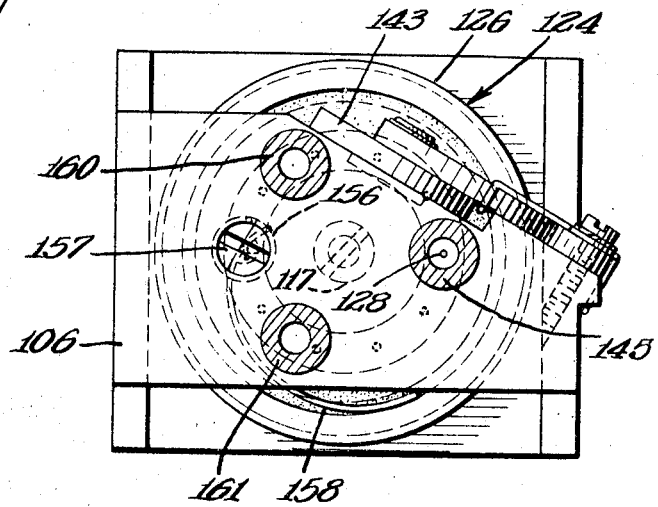
FIGURE 10 is a view partly in plan elevation and partly in cross-section of the generator device of FIGURE 8.
Figure 13:
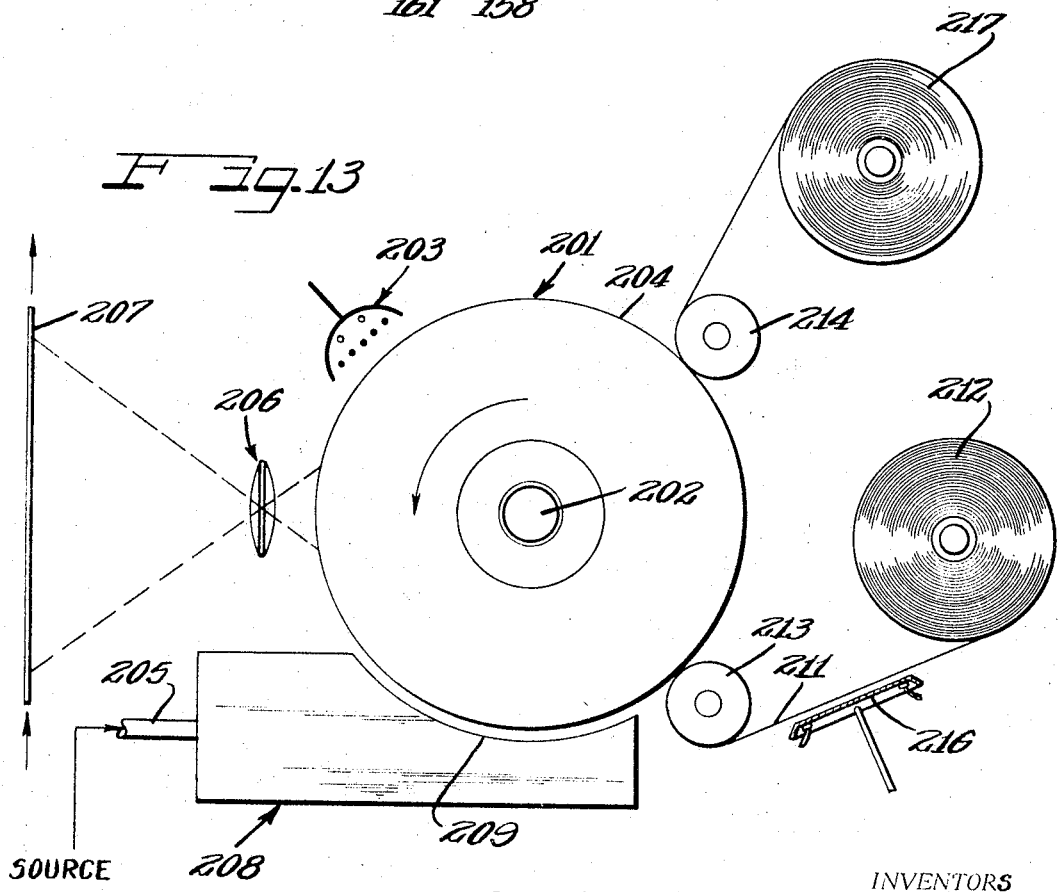
FIGURE 13 is a somewhat schematic view of an apparatus for practicing a continuous process of microimagery production.
Figure 14:
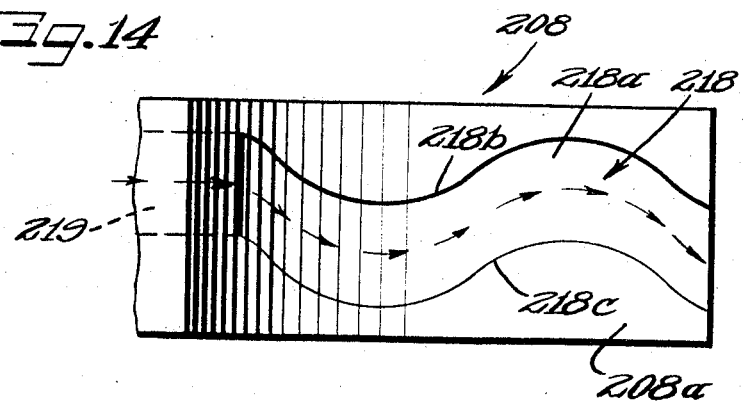
FIGURE 14 is a plan view of one form of a development electrode which can be used in conjunction with the system shown in FIGURE 13.
Figure 15:
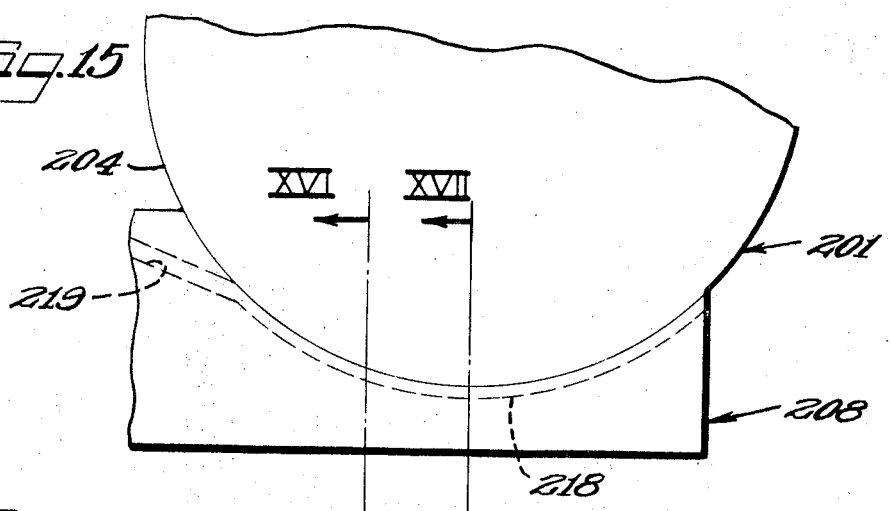
FIGURE 15 is a fragmentary view in elevation showing the manner in which the development electrode cooperates with the photoconductive cylinder.

The present invention contemplates an organization in which a support member having a photoconductive surface thereon is sequentially moved through an indexed series of separate steps. Various types of apparatus for moving the photoconductive surface through these separate steps have been described in our copending application Ser. No. 354,976 filed Mar. 26, 1964 which issued Nov. 8, 1966 as Patent No. 3,283,680 in which the present applicants were among the co-inventors.

The general organization can be seen from the rather schematic showings of FIGURES 1 to 4 inclusive. Specifically, in FIGURE 1 there is illustrated a support member at reference numeral 30 having a flat photoconductive surface 31 thereon, the surface 31 being of generally planar configuration. The support member 30 is carried on the end of a shaft 32, with the photoconductive surface 31 being exposed transversely relative to the shaft 32, so that the axis of the shaft 32 is substantially normal to the plane of the photoconductive surface 31. In the showing of FIGURE 1, the photoconductive surface 31 is positioned in charging relation with an ion-producing source identified generally at numeral 33 and taking the form of a corona discharge unit having plural corona wires 34 enclosed within a shield 36, with a control grid 37 extending across the opening of the shield 36. As illustrated by the arrow, the photoconductive surface 31 is rotated with the roation of the shaft 32 during the charging operation.

After charging, the photoconductive surface 31 is moved into a second position at the focal plane of a lens system. The lens system is indicated diagrammatically at 38, and may constitute an optical appartus which is arranged and constructed to project an image from a document positioned on a copy surface 39 onto the photoconductive surface 31. Suitable illumination means may be employed to effect such exposure, such as a pair of lamps 40.

The photoconductive surface 31 is then moved into a developing station at a third position which is indicated in FIGURE 3, in which a development chamber 41 having an inlet 42 and an outlet 43 is provided, the arrangement being such that the development chamber 41 may be supplied with toner material which is deposited on the photoconductive surface 31 within the developing chamber 41 to develop the latent electrostatic image contained on the image plane of the photoconductive surface 31. As indicated by the arrow in FIGURE 3, the shaft 32 is rotated during this development so that the toner particles sweep past different portions of the exposed photoconductive surface in succeeding increments of time.

Next, the photoconductive surface 31 is moved into a transfer station illustrated at FIGURE 4. A card support as shown at reference numeral 44 has a supporting surface 46 on which is positioned a copy medium such as an opaque or transparent card 47. The support 44 may be moved upwardly by a suitable actuating means 49 thereby to engage the copy medium 47 with the photoconductive surface 31 for the purpose of transferring the developed image from the surface 31 onto the copy medium 47. During this transfer, the shaft 32 is held stationary as is the support 44.

The showings of FIGURES 1 to 4 show somewhat schematically an electrostatographic system in which the developing takes place by rotating the photoconductive surface in its image plane while passing a suspension of toner particles in air across the face of the photoconductive surface. The same net result, that of eliminating tears and streaks, can also be performed with other systems of the type about to be described wherein the exposed photoconductive plate is held stationary, and the source of toner particles is moved relative to it. Such a system is illustrated in FIGURES 5 and 6 of the drawings. In this form of the invention, there is provided a support 51 to which a retaining ring 52 is secured by means of screws 53 or the like and has a radially inwardly extending bearing flange 52a. A collar 54 has an annular flange portion 56 received within the ring 52 in bearing engagement with the flange 52a for rotation. The collar 54 is secured to a front plate 57 by means of screws 58. The plate 57 has a central aperture in which a sleeve type bearing 59 extends. A support 61 carrying a flat photoconductive surface 62 is selectively inserted within the bearing 59. The photoconductive surface 62 is spaced from and faces a back plate electrode 63. The electrode 63 is insulated electrically from the support 51 and the collar 54 by means of an insulator means 64. An electrical lead 66 extends through the insulator 64 and supplies electrical potential to the electrode 63.

The support 51 has a continuous peripheral groove 67 which is supplied with a carrier stream having a suspension of toner particles through an inlet port 68. The collar 54 has an aperture 69 arranged to communicate with the groove 67. The aperture 69 communicates with a developing chamber 71 having diverging walls extending from the aperture 69, as best illustrated in FIGURE 5. The suspension of toner particles in air thereupon fans out and passes transverse to the axis of the support 61 in the gap existing between the back electrode 63 and the photoconductive surface 62. The stream is then directed to an exhaust groove 72 formed in the collar 54, whereupon the stream may be removed for recovery of the toner particles through an exhaust conduit 73.

The plate 57 and the collar 54 are rotatably driven by means of a drive pinion 76 secured to a shaft 77 while the photoconductive surface 62 remains stationary. The teeth of the pinion 76 mesh with teeth 78 formed on the periphery of the plate 57. It will be seen that as the plate 57 and the collar 54 rotate relative to the photoconductive surface 62, and the suspension of toner particles is introduced through the port 68, toner particles are continuously directed across the face of the photoconductive surface 62 from different radial angles, thereby sweeping the exposed face with the particles from all directions. The excess toner particles are exhausted into a peripheral groove 79 from which they may be directed through the exhaust line 73.

Another form of the invention is illustrated in FIGURE 7 wherein an oscillatory action occurs. This form makes use of a shaft 81 having a collar 82 thereon. Disposed within the collar 82 is an insulator 83 through which extends an electrical conductor 84. A back plate electrode 86 is applied with potential through the conductor 84. The electrode 86 is confined within an insulating ring 87 tightly received within a disk 88. Another disk 89 in confronting relation with the disk 88 has a sleeve type bearing 91 centrally thereof which receives a support 92 having a photoconductive surface 93 thereon facing the back electrode 86. The mixture of toner particles in an air stream is supplied to a developing chamber 94 between the two disks by means of a flexible inlet line 96, and the excess toner particle mixture is continuously withdrawn through a fitting 97 connected to a flexible exhaust line 98. In the form of the invention illustrated in FIGURE 7, the shaft 81 is oscillated through an arc of 180° while toner mixture is introduced into the inlet line 96. The toner suspension thereupon sweeps across the face of the photoconductive surface 93 and is continuously exhausted through the exhaust conduit 98. Again, there is provided relative rotative movement between the toner supply and the exposed photoconductive plate, so that the toner particles are directed across the face of the photoconductive support at constantly varying radial directions.

A device for preparing the suspension of toner particles in air has been illustrated in FIGURE 8 of the drawings. The particular assembly shown includes a plurality of spaced upright standards 101 on which is supported a frame including a lower member 102, two side walls 103 and 104, and an upper cross piece 106. The uprights 101 support an electric motor shown generally at 107 connected to a source of electrical power by means of conductors 108. The speed of the motor can be varied by the adjustment of a rheostat 109 having an adjusting arm 110. The motor 107 has a driving connection with a speed changer 111 connected by means of posts 112 to the lower member 102. A driven shaft 113 extends from the speed changer 111. A coupling member 114 is secured to the shaft by means of a set screw 116. The coupling member 114 is fastened to a shaft of reduced diameter shown at 117 by means of a set screw 118. The shaft 117 is journalled in a pair of spaced bearing assemblies 119 and 120 spaced the length of the shaft 119 by means of a support member 121 secured to the side walls 103 and 104 by means of bolts 122.

At the upper end, the shaft 117 is connected to a rotatable plate member 123 which forms the bottom wall of a bowl or cup-shaped reservoir shown generally at 124. The reservoir 124 has an upstanding ring shaped member 126 forming the side walls thereof and at the bottom edge, ring shaped member 126 is notched as indicated at 127 to snugly receive the peripheral edge of the plate 123.

Inwardly of the side walls of the bowl 124, the plate 123 is formed with a plurality of metering apertures 128. Each of the apertures is of a uniform length and diameter. Below the plate 123 there is a backing plate 129 which is urged upwardly by a spring (not shown) and engages the bottom of the plate 123 to seal the bottom of the apertures 128. The support member 31 is suitably recessed to receive a bushing 131 which, in turn, receives a flanged disk 132 and an "O"-ring sealing member 133 disposed between the disk 132 and the bushing 131 thereby to form a sealed passage which lies in register with a single aperture 128. Below the bushing 131 there is a passage 134 which is fed by means of a transverse passage 136. A nipple 137 and a conduit 138 are provided to introduce air into the assembly. The air is supplied from a blower 139 driven by a motor 141.

A crank arm 142 is pivotally mounted to the side wall 104 and carries at the end thereof a roller wheel 143 suitably journalled for rotation at the end of the crank arm 142. The roller wheel 143 is disposed to have its peripheral surface rotatably engage the upper surface of the plate 123 at a location corresponding to the row of metering apertures 128. A torsion spring 144 engages the crank arm 142 to bias the roller wheel 143 toward the plate 123.

A conduit 145 extends vertically through the cross piece 106 and at the end thereof has a ferrule 150 which receives and seats a seal ring 155 engaging the upper surface of the plate 123 in register with the aperture 128. The ferrule 150 also confines an "O"-ring sealing member 146 to provide a good seal with the conduit 145.

The upper end of the conduit 145 is threaded to receive a coupling member 140 which, in turn, is threaded to receive a fitting 147 which connects to a conduit 148 for delivering a suspension of the toner particles in the airstream through a discharge fitting such as that shown on the left-hand side of FIGURE 8. Fitting 149 has an internal passage 151 of gradually decreasing diameter terminating at an outlet end 152 which feeds an elongated discharge fitting 153, the arrangement being such as to break up and disperse any particulate material that may tend to agglomerate.

Figure 16:
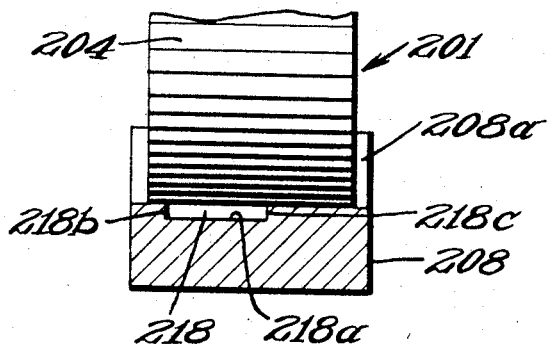
FIGURE 16 is a fragmentary cross-sectional view taken substantially along the line XVI—XVI of FIGURE 15.
Figure 17:
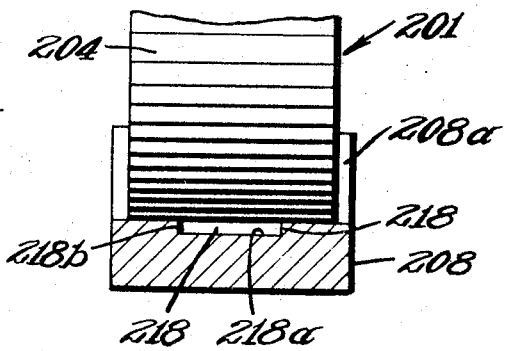
FIGURE 17 is a fragmentary cross-sectional view taken substantially along the line XVII—XVII of FIGURE 15.

As indicated in FIGURE 8, the assembly may have a number of discharge devices cooperating with the disk 123 to periodically inject a suspension of the powdered material in the airstream to a discharge fitting such as the fitting 149. This is best evident from the showing of FIGURE 10 from which it will be seen that the upper cross member 106 is formed with a vertically extending threaded aperture 156 in which there is threadedly received an adjusting screw 157. A doctor blade 158 is carried at the end of the adjusting screw 157. By adjusting the screw 157 in the threaded aperture 156, the spacing dimension between the plate 123 and the doctor blade 158 may be adjusted. Then, upon rotation of the plate 123, the doctor blade 158 operates to redistribute the particulated material.

The cross piece 106, in the form of the invention shown in FIGURE 10, carries three conduits 145, 160 and 161 in equally spaced relationship.

The arrangement of apertures 128 in the plate 123 with the conduits 145, 160 and 161 is such that the conduits are sequentially positioned by rotation of the disk 123 so as to overlie the apertures 128. This is best illustrated in FIGURE 12 of the drawings which represents a schematic development of the disk and aperture arrangement, in conjunction with the conduits. In FIGURES 10 and 12, the conduit 145 is shown in position where it overlies one of the apertures 128. At this point, the conduit 161 is spaced from an aperture by a distance identified as D in FIGURE 12. The other conduit 160, at this moment of time is spaced from an aperture 128 by a distance 2D. The distance between apertures is therefore 3D as illustrated in FIGURE 12.

Thus, as the disk 123 rotates, the conduits 145, 161 and 160 will be positioned sequentially over the apertures 128. As the plate 123 and the roller 143 move relatively to each other, the apertures 128 are charged with a predetermined quantity of particulate material. The charge is uniform because the apertures 128 are loaded by the wheel 143 which is urged by the continuous biasing means 144, and an adequate supply of particulate material is maintained in register with the annular row of apertures 128 by the doctor blade 158. As each aperture 128 comes in register with the openings provided on opposite sides of the plate, the pressurized carrier stream is directed through the aperture 128 thereby admixing the particulate material contained within the metering aperture 128 into the carrier stream. The amount of material in the streams is directly proportional to the rate of rotation of the plate 123, which can be carefully adjused by adjusting the rotational speed of the motor 107.

The operation of the system is illustrated schematically in FIGURE 12. The sequential introduction of toner particles in an airstream into the conduits 145, 160 and 161 delivers a particle laden stream to the series of spray orifices or nozzles 149, 167 and 168 disposed about a developing chamber. Diametrically opposed to the orifices or nozzles are discharged chambers 169, 170 and 171 respectively. The particulate spray issuing from the spray means is directed radially across the face of the charged electrode, and the excess material is collected in the discharge passages, and combined into a common discharge opening 172.

A more comprehensive showing of a suitable apparatus for developing will be found in FIGURES 9 and 11. The developing unit shown there consists of a pair of plate members 176 and 177 connected together by fasteners 178. The plates are in spaced relation to define a development chamber 179 of a size which is proportioned to channel the carrier stream in the form of a laminar flow stream. The plate member 176 has fastened thereto a bracket member 181 which has a boss 182 bored as at 183 to receive the stem 184 of a plunger arranged to be reciprocated toward and away from the remainder of the assembly.

The chamber 179 diverges as shown in FIGURE 11 to form discharge passages 186 and 187 opposite to the spray means 166 and 168 respectively. The various discharge passages communicate with an opening 188 in a tube 189, the tube being fitted into a conduit 190 which leads to a recovery system for the particulated material.

The plate member 176 is suitably recessed to accommodate a back electrode 191 seated in the insulator ring 192. The electrode 191 may be energized from a suitable source of voltage by the provision of a contact member 193 at its rear end.

The plate member 177 is suitably recessed to receive a sealing gasket 194 formed with a convoluted surface, thereby providing compressible bearing and sealing surfaces for engaging disk surfaces 196 and 197. These surfaces support the photoconductive surface 198 in opposed closely spaced relation to the back electrode 191. By controlling the charge on the electrode 191, the particulated toner material will be attracted to the charge pattern appearing on the photoconductive surface 198 and will render such charge pattern visible as a developed image.

Tears and streaks are avoided in the apparatus just described by sequentially introducing the toner particle mixture at different radial directions across the photoconductive surface 198. Additional benefits can be derived, however, if the photoconductive surface 198 is also rotated at the same time and, for this reason, the disks 196 and 197 carrying the photoconductive surface 198 may be mounted for rotation on a shaft 199 driven by a suitable prime mover.

The embodiments discussed thus far have all made use of flat photoconductive surfaces, with provisions for introducing the toner particles generally radially of the surface while there is relative movement between the source of toner particles and the photoconductive surface and wherein the various procedures are practiced at planetary stations.

The principles of the present invention are equally applicable, however, to a continuous process, for example, the cylindrical type electrostatographic assemblies, the general organization of which is illustrated in FIGURE 13 of the drawings. The organization shown schematically in that figure includes a rotatable cylinder 201 having a photoconductive surface 204 thereon, and mounted for rotation on a shaft 202. As the cylinder 201 rotates counterclockwise as viewed in FIGURE 13, the photoconductive surface 204 is uniformly charged by a corona charging unit 203. After the cylinder surface is charged by the unit 203, it positions the photoconductive surface 204 in the focal plane of an optical lens system generally illustrated at numeral 206 in the drawings which focuses thereon the image from copy material 207 carried on a suitable transport apparatus indicated schematically by arrows, thereby to form a latent electrostatic image. Next, the charged and exposed portion of the cylinder 201 bearing the latent electrostatic image is driven past a developing electrode 208 having an arcuate portion 209 in closely spaced confronting relation with the periphery of the cylinder 201. A supply of developer material is directed from a source through a conduit 205 to the portion 209. The developed image on the surface of the cylinder is then transferred to an image carrier 211 which may constitute a film strip supplied from a supply roll 212, and passing about guide rollers 213 and 214 which apply the carrier 211 against the periphery of the cylinder 201. Prior to such contact the carrier 211 may be conditioned to accept the image by the provision of a conditioning device 216 which pre-softens the film surface for example. Thereafter, the developed film strip is reeled up on a take-up roll 217.

The normal relation of the development electrode 208 to the surface of the drum 201 is only one or two thousandths of an inch (greatly exaggerated in FIGURE 13) and there is formed a surface 208*a* which is wider than the drum 201, thereby leaving space at each side of the drum 201.

In the form of the invention shown in FIGURES 14 to 17 inclusive, the development electrode 208 has a groove 218 formed in the surface 208a facing the periphery of the cylinder 201 of a width corresponding generally to the width of the image area to be developed. The groove 218 is fed from a slot 219 wherein an airborne suspension of toner particles is introduced under conditions of generally laminar flow. As shown in FIGURES 16 and 17 particularly, the groove 218 is of uniform depth being generally rectangular in cross-sectional configuration and having a bottom wall 218a and spaced side walls 218b and 218c. The groove 218 is undulating in character, being generally sinusoidal in configuration. The suspension of toner particles, in following the groove 218 thereby undergoes substantial changes in direction in passing across the confronting surface of the cylinder 201, thereby substantially eliminating the tendency to produce tears and streaks.

In the form of the invention illustrated in FIGURES 18 to 22, inclusive, a groove of varying depth is provided in the surface 208a. In this form of the invention, the groove is illustrated generally at numeral 221 as having a longitudinally extending portion essentially the same width as the image area, and is fed by a powder channel 222 as indicated in FIGURE 19. The groove configuration includes triangular portions 223 of relatively shallow depth spaced apart in alternate inverted position, transversely extending channel portions 224 of intermediate depth positioned between the triangular portions 223, and extreme end portions 225 and 226 of maximum depth. The end portions are spaced outwardly of the main groove 221 and comprise curved segments spaced opposite the triangular portions 223, thereby connecting the channels 224. It will be seen that the airborne suspension of toner particles in this form of the invention follow a tortuous path as the particle suspension moves relative to the charged surface of the cylinder 201.

FIGURES 23 through 27 illustrates still another modified form of the invention. In this arrangement, the development electrode 231 has a continuous median groove 232 of uniform depth therein, fed by means of a powder channel 233. By providing relatively deep grooves or relief recesses 234 and 235 at opposite sides of the median portion 232 in alternate spaced relation to one another the gaseous carrier stream with the developer particles entrained therein tends to follow the path of least resistance, thereby developing an undulating flow pattern which achieves the multi-directional flow concept of this invention.

It should be evident that various modifications can be made to the described embodiments without departing from the scope of the present invention.

We claim as our invention:

1. The method of electrostatographic reproduction which comprises
    electrostatically charging a photoconductive surface,
    exposing the charged surface to produce a latent electrostatic image thereon, positioning a source of powdered toner material at the periphery of said charged surface, and
    sweeping toner across said surface in a plurality of non-parallel directions while said surface is stationary to thereby avoid tearing and streaking of the image.

2. The method of electrostatographic reproduction which comprises
    electrostatically charging a flat photoconductive surface,
    exposing the charged surface to produce a latent electrostatic image thereon, positioning a source of powdered toner material at the periphery of said charged surface, and
    rotating said source about said charged surface,
    and dispersing toner particles from said source during such rotation to cause radial sweeping of the charged surface by said toner particles.

3. The method of electrostatographic reproduction which comprises
    electrostatically charging a flat photoconductive surface,
    exposing the charged surface to produce a latent electrostatic image thereon, positioning a source of powdered toner material at the periphery of said charged surface,
    oscillating said source with respect to said charged surface,
    and dispersing toner particles from said source during such oscillation to cause radial sweeping of the charged surface by said toner particles.

4. The method of electrostatographic reproduction which comprises
    electrostatically charging a flat photoconductive surface,
    exposing the charged surface to produce a latent electrostatic image thereon, positioning a plurality of toner spray means about the periphery of said charged surface, and sequentially ejecting toner particles from said spray means to thereby cause toner particles to sweep radially across said charged surface in non-parallel directions.

5. The method of electrostatographic reproduction which comprises
    electrostatically charging the surface of a photoconductive cylinder,
    exposing the charged surface to produce a latent electrostatic image thereon,
    rotating said cylinder about its axis,
    and distributing toner particles to said charged surface in an undulating pattern substantially parallel to said axis while said cylinder is rotating.

6. The method of electrostatographic reproduction which comprises
    electrostatically charging the surface of a photoconductive cylinder,
    exposing the charged surface to produce a latent electrostatic image on said surface,
    directing an airborne stream of toner particles under conditions of substantially laminar flow in a confined path conforming generally to a portion of the periphery of said cylinder,
    and moving said particles in an undulating pattern substantially parallel to the cylinder axis while so confined.

7. An electrostatic apparatus comprising
    a photoconductive surface,
    supply means for delivering toner particles to the periphery of said photoconductive surface,
    and toner particle channel means adjacent said surface including means cooperating with said channel means for imparting non-parallel multi-directional movement to said particles in the plane of said surface,
    whereby said toner particles are distributed in a plurality of directions across said photoconductive surface.

8. The electrostatic apparatus as set forth in claim 7 wherein the path of said particle movement is generally arcuate.

9. An electrostatographic apparatus comprising
    a support,
    a flat photoconductive surface on said support,
    distributor means at the periphery of said surface for distributing toner particles radially across said surface, and means for rotating said distributor means about said surface.

10. An electrostatographic apparatus comprising
    a support,
    a flat photoconductive surface on said support,
    distributor means at the periphery of said surface for distributing toner particles radially across said surface,
    and means for oscillating said distributor means about said surface to thereby change the radial angle at which toner is distributed across said surface.

11. An electrostatographic apparatus comprising
a support,
a flat photoconductive surface on said support,
a plurality of spray means spaced about the periphery of said surface,
and means for delivering toner particles to each of said spray means in sequence to thereby distribute toner particles across said surface in non-parallel directions from different radial positions.

12. An electrostatographic apparatus comprising a support, a flat photoconductive surface on said support, at least three spray means spaced about the periphery of said surface for non-parallel toner delivery thereacross, conduit means for transferring masses of toner particles to said spray means in sequence, and conveyor means arranged to deliver discrete masses of toner particles to said conduit.

13. An electrostatographic apparatus comprising
a cylinder having a photoconductive surface,
said cylinder being mounted for rotation about its axis,
means for elastrostatically charging said surface,
means for applying an optical image onto the charged surface,
a development electrode having a portion conforming to the periphery of said cylinder and spaced therefrom,
said development electrode having an undulating slot therein which undulates generally parallel to said axis,
and means for introducing toner particles to said electrode for passage along said slot.

14. The apparatus of claim 13 in which the depth of said slot varies from a minimum depth centrally of the slot to a maximum depth at the extreme lateral edges of said slot.

15. The apparatus of claim 13 in which the depth of said slot is constant throughout.

16. The apparatus of claim 13 in which said slot has a constant depth along a line parallel to the periphery of said cylinder and an increased depth along its outer edges.

References Cited

UNITED STATES PATENTS

| | | | |
|---|---|---|---|
| 2,690,394 | 9/1954 | Carlson | 96—1 |
| 2,730,023 | 1/1956 | Greig | 95—1.7 |
| 2,747,735 | 5/1956 | Palm | 118—637 X |
| 2,854,947 | 10/1958 | Giaimo | 118—637 |
| 2,877,132 | 3/1959 | Matthews | 117—17.5 |
| 2,911,944 | 11/1959 | Hayford et al. | 118—637 |
| 2,927,554 | 3/1960 | Oldenboom | 118—637 |
| 2,955,052 | 10/1960 | Carlson et al. | 117—17.5 |
| 3,146,687 | 9/1964 | Donelson et al. | 95—1.7 |
| 3,283,680 | 11/1966 | Smitzer et al. | 95—1.7 |
| 3,334,613 | 8/1967 | Young | 118—637 |

NORMAN G. TORCHIN, *Primary Examiner.*

C. E. VAN HORN, *Assistant Examiner.*

U.S. Cl. X.R.

117—17.5; 118—637; 355—3